United States Patent
Hu et al.

(10) Patent No.: US 12,523,583 B2
(45) Date of Patent: Jan. 13, 2026

(54) MEASURING METHOD AND DEVICE FOR TRACE AND ULTRA-TRACE OIL CONTENT

(71) Applicant: TECHNICAL INSTITUTE OF PHYSICS AND CHEMISTRY, CHINESE ACADEMY OF SCIENCES, Beijing (CN)

(72) Inventors: Zhongjun Hu, Beijing (CN); Bingming Wang, Beijing (CN); Qiang Li, Beijing (CN); Linghui Gong, Beijing (CN)

(73) Assignee: TECHNICAL INSTITUTE OF PHYSICS AND CHEMISTRY, CHINESE ACADEMY OF SCIENCES, Beijing (CN)

( * ) Notice: Subject to any disclaimer, the term of this patent is extended or adjusted under 35 U.S.C. 154(b) by 330 days.

(21) Appl. No.: 18/325,098

(22) Filed: May 29, 2023

(65) Prior Publication Data
US 2024/0035938 A1  Feb. 1, 2024

Related U.S. Application Data

(63) Continuation of application No. PCT/CN2023/079824, filed on Mar. 6, 2023.

(30) Foreign Application Priority Data

Jul. 26, 2022  (CN) .......................... 202210882115.2

(51) Int. Cl.
  *G01N 1/40*  (2006.01)
  *G01N 21/3577*  (2014.01)
  *G01N 33/24*  (2006.01)

(52) U.S. Cl.
  CPC ....... *G01N 1/4022* (2013.01); *G01N 21/3577* (2013.01); *G01N 33/241* (2013.01); *G01N 2001/4033* (2013.01)

(58) Field of Classification Search
  CPC ............... G01N 1/4022; G01N 1/4055; G01N 21/3577; G01N 33/28; G01N 33/241
  See application file for complete search history.

(56) References Cited

U.S. PATENT DOCUMENTS

| | | | | |
|---|---|---|---|---|
| 3,022,659 A | * | 2/1962 | Rochus | B01D 9/004 |
| | | | | 73/61.76 |
| 3,589,169 A | * | 6/1971 | Lafitte | G01N 25/142 |
| | | | | 95/290 |

(Continued)

FOREIGN PATENT DOCUMENTS

| | | | | |
|---|---|---|---|---|
| DE | 3729374 C1 | * | 12/1988 | ............. G01N 30/00 |
| FR | 2304044 A1 | * | 8/1976 | ................. F25J 3/08 |
| WO | WO-2021233575 A1 | * | 11/2021 | ................. F17C 9/00 |

*Primary Examiner* — John Fitzgerald

(57) ABSTRACT

The present disclosure relates to a measuring method and device for trace and ultra-trace oil content. The measuring device of the present disclosure includes a cryogenic enriching device, an extracting device and an infrared spectrometer; The cryogenic enriching device includes a Dewar container and a U-shaped pipe; The extracting device includes an extractant container, an input pipe, an outlet pipe and an extraction liquid quantitative pipe; A mass flowmeter is further disposed on the U-shaped pipe, the oil content in the gas is calculated according to the measured total mass of the gas and the oil concentration of the extraction liquid measured by the infrared spectrometer. The present disclosure further provides a measuring method, which converts the measurement of oil content in gas into the measurement of oil concentration in liquid extractant through effective extraction by liquid nitrogen cold trap enrichment mode, and adopts infrared spectrophotometry to accurately measure.

20 Claims, 2 Drawing Sheets

(56) References Cited

U.S. PATENT DOCUMENTS

| | | | | |
|---|---|---|---|---|
| 3,734,056 | A * | 5/1973 | King | G01N 21/3577 |
| | | | | 118/733 |
| 4,668,261 | A * | 5/1987 | Chatzipetros | F25J 3/0685 |
| | | | | 62/55.5 |
| 4,887,434 | A * | 12/1989 | Pilwat | G01N 30/00 |
| | | | | 62/55.5 |
| 4,992,083 | A * | 2/1991 | Mueller | B01D 8/00 |
| | | | | 96/101 |
| 5,301,536 | A * | 4/1994 | Ortega | G01N 33/2823 |
| | | | | 96/108 |
| 9,347,919 | B2 * | 5/2016 | Fukumoto | G01N 1/24 |
| 11,491,416 | B2 * | 11/2022 | Bayne | B01D 11/0219 |

* cited by examiner

MEASURING METHOD AND DEVICE FOR TRACE AND ULTRA-TRACE OIL CONTENT

CROSS-REFERENCE TO RELATED APPLICATIONS

This application is a continuation of co-pending International Patent Application Number PCT/CN2023/079824, filed on Mar. 6, 2023, which claims the benefit and priority of Chinese Patent Application Number 202210882115.2, filed on Jul. 26, 2022, with China National Intellectual Property Administration, the disclosures of which are incorporated herein by reference in their entireties.

TECHNICAL FIELD

The present disclosure relates to oil content detection, and more particularly to a measuring method and a device for trace and ultra-trace oil content.

BACKGROUND

Oil content in gas is an important indicator to evaluate the quality of gas products. The measuring method of trace oil in industrial compressed gas is an essential foundational research study in native and foreign nations, which is mainly to accurately measure the oil concentration at minor, trace, and ultra-trace in compressed gas. In oxygen making industry, the oil content of compressed air will affect the safety of oxygen-making devices. If the oil content in nitrogen, helium, or air used in space launches is too high, it will cause harm to the gas supply pipeline, fuel delivery system, and engine system of satellites and rockets. If nitrogen, helium, and air are used in special industrial departments, especially aerospace industry departments, the oil content is required to be accurate. In Chinese national standards, there is no limit on the oil content in air and helium, and there is no corresponding measuring method. There is still no mature and simple analytical method for measuring trace oil content in the gas. The main methods for measuring oil content are the gravimetric method and the spectrophotometry method. The gravimetric method is adapted for measuring high-content oil in liquid.

The concentration range of oil content in gas is generally below 100 ppm, and the composition of the oil is complex, so it is generally impossible to measure directly, which is necessary to quantitatively enrich samples in advance. The common absorption methods are solvent absorption, adsorption materials, condensation enrichment, and so on. The main components of the oil are long-chain alkanes or aromatic hydrocarbons with characteristic absorption peaks at 2930 cm−1, 2960 cm−1, and 3030 cm−1, respectively corresponding to the asymmetric stretching vibration frequencies of the C—H bond in the CH3-group, C—H bond in-CH2-group and C—H bond in the aromatic ring. The infrared spectrophotometry method is defined into the infrared spectrophotometry method and the non-dispersive infrared spectrophotometry method. The infrared spectrophotometry method can respectively measure the characteristic absorption of methyl, methylene, and aromatic rings, and correct the interaction between aliphatic hydrocarbons and aromatic hydrocarbons. It is suitable for the analysis of oils from different sources or types, and accurate quantitative analysis without determining special standard oils.

In the temperature range of liquid hydrogen and the temperature range of liquid helium, lubricating oil components will become solid particles in a low-temperature environment, which will cause accidents on high-speed turboexpander as the core moving component or pipeline blockage of cryogenic system, and seriously reduce the refrigeration performance of the whole helium liquefier or refrigerator, which is one of the frequent accidents in cryogenic systems such as scientific devices. Therefore, the requirement of oil content in helium medium is less than 10 ppb. For the sake of safety, it is necessary to monitor the purity of helium or hydrogen medium in real-time, and once the oil content exceeds the standard threshold, to enter the emergency treatment procedure. Since it is a measurement in the ultra-trace and trace range, reliable enrichment methods and analytical methods are needed.

In order to avoid serious accidents caused by oil pollution in cryogenic system, it is necessary to monitor and analyze the oil content in high-purity helium medium in the actual operation of various hydrogen/helium refrigerators or liquefiers. Generally, it is required that the oil content should not exceed 10 ppbW (i.e. ug/kg, W is the mass ratio of concentration). The oil measurement module of WE34M-3/SM38, a multi-component composition analyzer of Linde Company, is commonly used in cryogenic engineering, of which the working principle is the photoelectric effect, that is, to discharge between two metal electrodes through alternating current to stimulate gas to emit light. The sensor and signal amplifier with photodiode are used to convert the photocurrent into voltage value, and the concentration of the measured substance can be obtained by an AD conversion device. In order to detect the oil content in helium, the oil should be pyrolyzed into volatile gaseous hydrocarbons with only 1 to 3 carbon atoms, and then sent to the WE34M-3/SM38 for measuring. The oil mist in helium is separated and concentrated through a filter, and the concentration time is set to be between 10 minutes and several hours. Excessive oil mist usually leads to an overload of the filter screen. Sometimes if the concentration time is too short, the oil will squeeze through the filter screen so that the measurement causes the contaminated device. The pyrolysis products in the pyrolysis chamber are in the molecular form of hydrocarbons, and CxHy containing 1 to 3 carbon atoms is measured in vpm. The measurement result is multiplied by the correction factor (from the correction of oil mist, the mass of oil mist deposited on the filter screen in the concentration stage), and then divided by the total helium mass passing through the filter in the concentration step, so as to obtain the mass ratio of oil mist in helium in ppb. However the above-mentioned measuring methods and devices have the following problems: 1) The oil content measuring range is narrow, and the oil content in pure helium ranges from 0 to 250 ppb. Since the oil content is more than 100 ppm in cryogenic engineering, in a case where the oil content is more than 250 ppb, the concentration, filtration, cracking, and analysis chamber of photoelectric analysis can be polluted, and the device data can not reflect the actual oil content, and even the device will be damaged due to pollution. 2) It is necessary to calibrate the oil with different compositions, and the carrier gas can only be helium. The composition of oil in actual cryogenic engineering is different, and sometimes it may be a mixture of several components. 3) Only one method can not compare the accuracy of measurement. In actual cryogenic engineering, oil pollution accidents still occur in the cryogenic system but the measurement data is qualified.

Therefore, it is necessary to solve the analysis problem of trace (ppm) and ultra-trace (ppb) oil content in large-scale cryogenic engineering. Because the compositions of compressor lubricating oil for the cryogenic refrigeration cycle are different, and the oil pollution composition from other devices such as vacuum pumps and the environment is unknown, it is necessary to have a method and device that can accurately measure the trace and ultra-trace oil contents covering various oil pollution compositions

SUMMARY

In order to overcome the above technical problems, the present disclosure provides a measuring method and device for trace and ultra-trace oil content, which is in a liquid nitrogen cold trap enrichment mode, converts the measurement of oil content in gas into the measurement of oil concentration in liquid extractant through effective extraction, and employs an infrared spectrophotometric method for accurate measuring, thus being adapted for environmental analysis of oil and gas samples strictly controlled in special fields such as aerospace.

The present disclosure provides a measuring device for trace and ultra-trace oil content, which includes a cryogenic enriching device to enrich and sample trace and ultra-trace oil components in gas, an extracting device to extract the oil components, and an infrared spectrometer to analyze oil content from the extracted liquid.

The cryogenic enriching device includes a Dewar container to receive and discharge liquid nitrogen, and a U-shaped pipe soaked in liquid nitrogen, wherein the gas circulates in the U-shaped pipe to form a liquid nitrogen cold trap to realize enriching and sampling of oil components in the gas.

The extracting device includes a container to store an extractant, an input pipe to input the extractant into the U-shaped pipe, an outlet pipe to export the extraction liquid, and an extraction liquid quantitative pipe, wherein the extractant in the input pipe flows into the U-shaped pipe from near the gas inlet thereof, the extraction liquid obtained by extracting flows out of the U-shaped pipe from near the gas outlet thereof and is stored in the extraction liquid quantitative pipe after flowing through the outlet pipe, and the extraction liquid quantitative pipe is employed to measure the volume of the extraction liquid.

The U-shaped pipe is further provided with a mass flowmeter to measure the total mass of the passed gas, and the oil content in the gas is calculated according to the measured total mass of the gas and the oil concentration of the extraction liquid measured by the infrared spectrometer.

Alternatively, the U-shaped pipe is a wall heat exchange steel pipe or a glass pipe, and a plurality of glass microspheres are further filled in the U-shaped pipe, and the glass microspheres interfaces on two sides of the U-shaped pipe are higher than the liquid nitrogen interface, which increases the contact area between gas and extractant and is conducive to extracting the oil components.

Alternatively, the diameter of the glass microsphere is 0.5 to 2 mm, and the porosity of the filled glass microspheres is 50 to 85%.

Alternatively, the inlet end surface and the outlet end surface of the U-shaped pipe are provided with dust removal filters with an accuracy of 1 to 5 μm. Automatic controlling valves are disposed at the gas inlet and the gas outlet of the U-shaped pipe.

Alternatively, the inlet end surface and the outlet end surface of the U-shaped pipe are disposed outside the Dewar container, and are adapted to adjust the U-shaped pipe to lift up and down.

Alternatively, automatic controlling valves are disposed at the input pipe and the outlet pipe.

The extraction liquid quantitative pipe is connected with the infrared spectrometer through a two-way conduit, one end thereof to automatic inject sample and with the other end thereof to discharge the liquid. An automatic controlling valve is disposed at the upstream unshunt place of the two-way conduit, and an automatic controlling valve is further disposed on the end of the two-way conduit to discharge the liquid.

Alternatively, the extractant is trichlorotrifluoroethane or carbon tetrachloride.

Alternatively, a liquid nitrogen injection port and a discharge port are disposed on the Dewar container, a liquid nitrogen level meter is disposed inside the Dewar container, a thermometer is disposed inside the U-shaped pipe, and a heater is disposed outside the U-shaped pipe, wherein after enriching and sampling in a cold trap, the sample is heated to quickly recover to ambient temperature before extracting.

Alternatively, the measuring range of the measuring device is 1500 ppmW-1 ppbW.

The present disclosure further provides a measuring method for trace and ultra-trace oil content with the device described above, including the following steps:

S1: enriching and sampling the trace and ultra-trace oil components in gas by liquid nitrogen cold trap.

S2: extracting the enriched sample by adding the extractant.

S3: according to HJ637-2018 water quality, petroleum, animal, and plant oil measurement standard, measuring the oil concentration of the extraction liquid by the infrared spectrometer, and calculating the oil mass in the extraction liquid.

S4: measuring the total mass of passed gas by a mass flowmeter.

S5: according to the total mass of the gas obtained in the step S4 and the mass of the oil obtained in the step S3, calculating to obtain the oil content in the gas.

Compared with the prior art, the present disclosure has the advantages of:

The method and device for measuring trace and ultra-trace oil content of the present disclosure, which is in a liquid nitrogen cold trap enrichment mode, converts the measurement of oil content in gas into the measurement of oil concentration in liquid extractant through effective extraction, and employs an infrared spectrophotometric method for accurate measuring with the measurement accuracy of 1500 ppmW to 1 ppbW which is a wide measurement range, thus realizing reliable measurement in ultra-trace and trace ranges. The present disclosure can find the pollution source in cryogenic engineering conveniently, quickly, and accurately, so as to further solve the problem of oil pollution in a cryogenic system according to the pollution source. Since each oil oxidized or degraded substance has slightly different absorption of infrared light with different wavelengths at the molecular level, it can be identified according to the infrared spectrum. The present disclosure is adapted for environmental analysis with strict control of oil and gas samples in special fields such as aerospace, and has a wide range of applications.

REFERENCES IN THE DRAWINGS

1—cryogenic enriching device; 11—Dewar container; 12—U-shaped pipe; 121—Mass flowmeter; 122—Glass microspheres; 123—Dust removal filter; 13—Liquid level meter; 2—extracting device; 21—Extractant container; 22—Input pipe; 23—output pipe; 24—extraction liquid quantitative tube; 3—infrared spectrometer; 4—Automatic controlling valve; 5—two-way conduit.

DETAILED DESCRIPTION OF EMBODIMENTS

The present disclosure is described in further detail below with reference to the accompanying drawings and specific embodiments. As described below are preferred embodiments of the present disclosure, it should be noted that, to those having ordinary skill in the art, several modifications and equivalents may be made without departing from the principles of the embodiments of the present disclosure, and these modifications and equivalents are also considered to be within the scope of the present disclosure.

Figure 1:
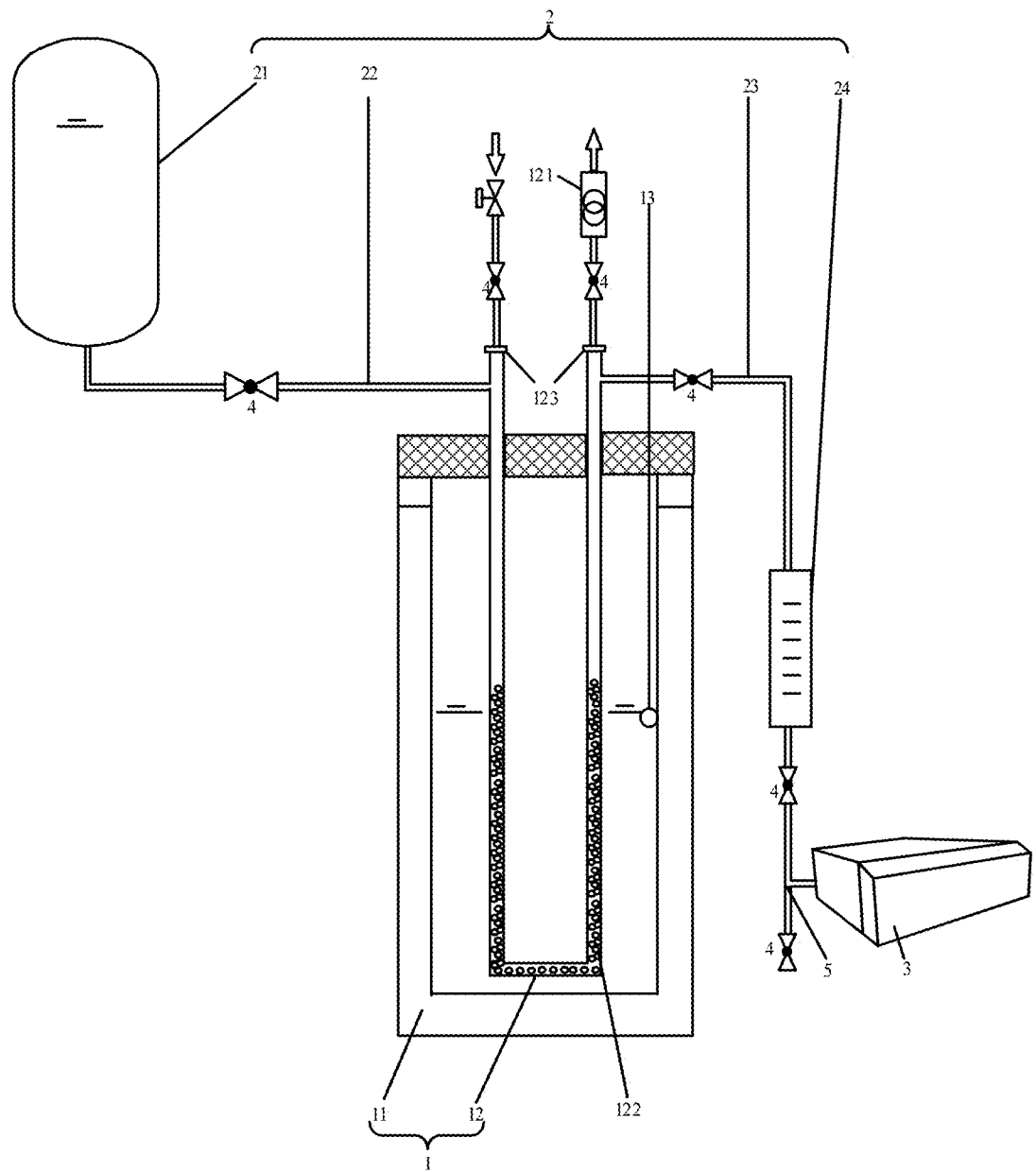
FIG. 1 is a schematic diagram of a measuring device for trace and ultra-trace oil content according to the present disclosure.
Figure 2:
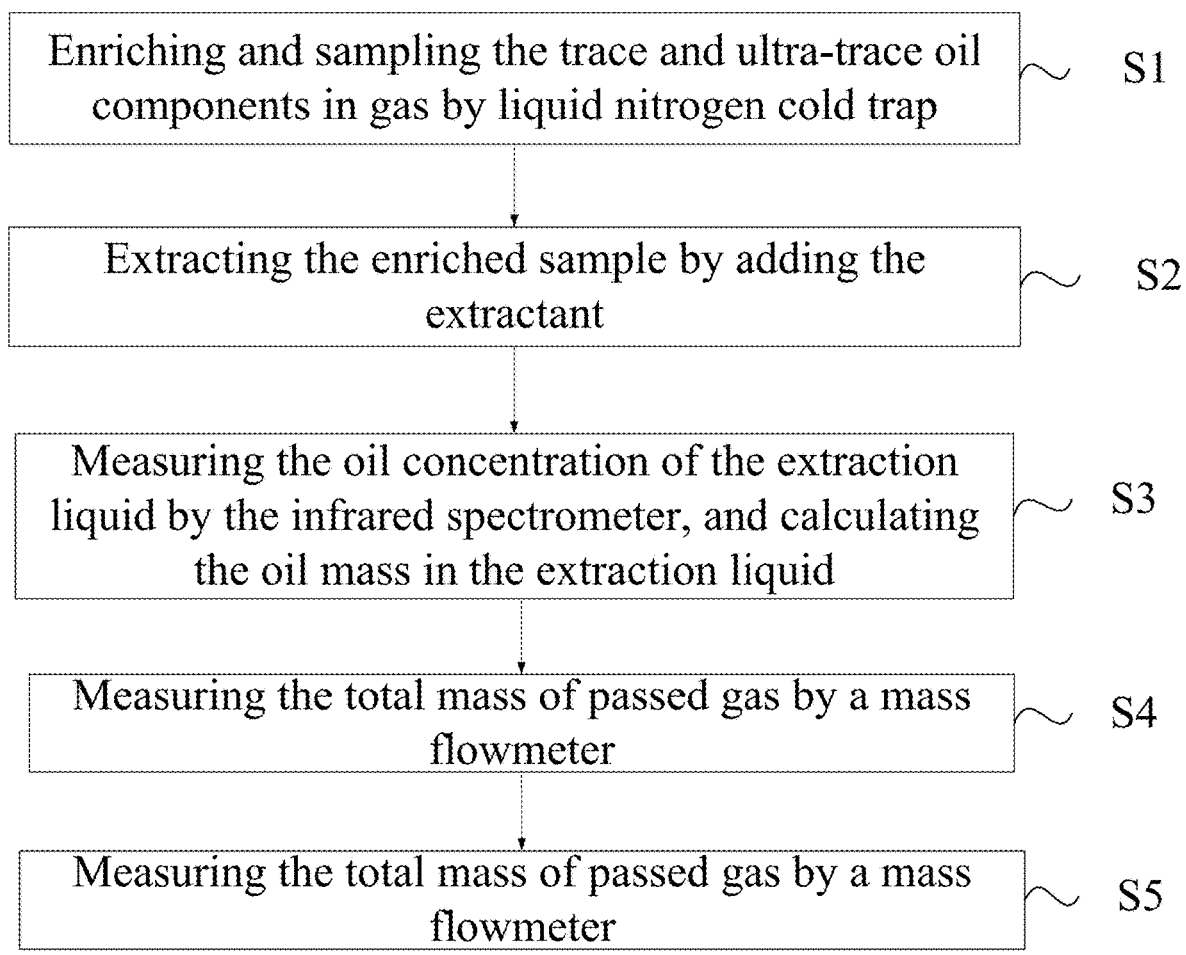
FIG. 2 is a flow chart of a measuring method for trace and ultra-trace oil content according to the present disclosure.

As shown in FIG. 1 which is a schematic diagram of a measuring device for trace and ultra-trace oil content according to the present disclosure, the measuring device includes a cryogenic enriching device to enrich and sample trace and ultra-trace oil components in gas, an extracting device to extract the oil components, and an infrared spectrometer to analyze oil content from the extracted liquid.

The cryogenic enriching device 1 includes a Dewar container 11 to receive and discharge liquid nitrogen, and a U-shaped pipe 12 soaked in liquid nitrogen, wherein the gas circulates in the U-shaped pipe to form a liquid nitrogen cold trap to realize enriching and sampling of oil components in the gas.

The extracting device 2 includes a container 21 to store an extractant, an input pipe 22 to input the extractant into the U-shaped pipe, an outlet pipe 23 to export the extraction liquid, and an extraction liquid quantitative pipe 24, wherein the extractant in the input pipe 22 flows into the U-shaped pipe 12 from near the gas inlet thereof, the extraction liquid obtained by extracting flows out of the U-shaped pipe 12 from near the gas outlet thereof and is stored in the extraction liquid quantitative pipe after flowing through the outlet pipe 23, and the extraction liquid quantitative pipe 24 is employed to measure the volume of the extraction liquid.

The U-shaped pipe 12 is further provided with a mass flowmeter 121 to measure the total mass of the passed gas, and the oil content in the gas is calculated according to the measured total mass of the gas and the oil concentration of the extraction liquid measured by the infrared spectrometer 3.

The U-shaped pipe 12 is a wall heat exchange steel pipe or a glass pipe, and a plurality of glass microspheres 122 are further filled in the U-shaped pipe 12, and the glass microspheres interfaces on two sides of the U-shaped pipe 12 are higher than the liquid nitrogen interface, which increases the contact area between gas and extractant and is conducive to extracting the oil components. Alternatively, the diameter of the glass microsphere 122 is 0.5 to 2 mm, and the porosity of the filled glass microspheres 122 is 50 to 85%.

The inlet end surface and the outlet end surface of the U-shaped pipe 12 are provided with dust removal filters 123 with an accuracy of 1 to 5 μm. An automatic controlling valve 4 is provided at the gas inlet and the gas outlet of the U-shaped pipe 12, which can quantitatively control the gas mass to be liquid nitrogen cold trap enriched and extracted.

The inlet end surface and the outlet end surface of the U-shaped pipe 12 are disposed outside the Dewar container 11, and are adapted to adjust the U-shaped pipe 12 to lift up and down.

An automatic controlling valve 4 is provided on the input pipe 22 and the outlet pipe 23 to control the addition of the extractant and the collection of the extraction liquid. The extraction liquid quantitative pipe 24 is connected with the infrared spectrometer 4 through a two-way conduit 5, one end thereof to automatically inject sample and with the other end thereof to discharge the liquid. An automatic controlling valve 4 is disposed at the upstream unshunt place of the two-way conduit 5, and an automatic controlling valve 4 is further disposed on the end of the two-way conduit 5 to discharge the liquid. Alternatively, the extractant is trichlorotrifluoroethane or carbon tetrachloride. If the oil concentration of the extraction liquid exceeds the upper limit of the infrared spectrometer 3, the extraction liquid can be diluted and then sampled for measurement, and the dilution can be done multiple times.

A liquid nitrogen injection port and a discharge port are disposed on the Dewar container 11, a liquid nitrogen level meter 13 is disposed inside the Dewar container 11, a thermometer is disposed inside the U-shaped pipe 12, and a heater is disposed outside the U-shaped pipe 12, wherein after enriching and sampling in a cold trap, the sample is heated to quickly recover to ambient temperature before extracting. A vibration device can further be disposed to realize vibration extraction, so that the extraction is more effective and uniform.

The present disclosure further provides a measuring method for trace and ultra-trace oil content with the device described above, including the following steps:

S1: enriching and sampling the trace and ultra-trace oil components in gas by liquid nitrogen cold trap.

S2: extracting the enriched sample by adding the extractant.

S3: alternatively, according to HJ637-2018 water quality, petroleum, animal, and plant oil measurement standard, measuring the oil concentration of the extraction liquid by the infrared spectrometer, and calculating the oil mass in the extraction liquid.

S4: measuring the total mass of passed gas by a mass flowmeter.

S5: according to the total mass of the gas obtained in the step S4 and the mass of the oil obtained in the step S3, calculating to obtain the oil content in the gas.

According to the Chinesenational standard method HJ637-2018, the determination of petroleum and animal and plant oils by infrared spectrophotometry, the molecular functional groups 2930 cm−1 (CH3), 2960 cm−1 (CH2) and 3030 cm−1 (aromatic hydrocarbons) are the main components of oils used in cryogenic engineering, which can be characterized by these three functional groups. Therefore, the reference oil solutions of standard oils (methyl, methylene and aromatic hydrocarbons) covering various molecular characteristics of cryogenic engineering oils are prepared to prepare standard samples with different oil concentrations. The absorbance of standard sample was measured by the infrared spectrometer, and the linear relationship between oil concentration and absorbance of the oil solution was obtained. Then the absorbance of extract sample was measured by the infrared spectrometer, and the oil concentration of extract sample was calculated according to the linear relationship. Alternatively, 10 times infrared analyses of the extract sample are required, and the data are valid only when the relative standard deviation (RSD) of each data is within 0.5%, avoiding random measurement errors.

Compared with the prior art, the present disclosure has the advantages of:

The method and device for measuring trace and ultra-trace oil content of the present disclosure, which is in a liquid nitrogen cold trap enrichment mode, converts the measurement of oil content in gas into the measurement of oil concentration in liquid extractant through effective extraction, and employs an infrared spectrophotometric method for accurate measuring with the measurement accuracy of 1500 ppmW to 1 ppbW which is a wide measurement range, thus realizing reliable measurement in ultra-trace and trace ranges. The present disclosure can find the pollution source in cryogenic engineering conveniently, quickly, and accurately, so as to further solve the problem of oil pollution in the cryogenic system according to the pollution source. Since each oil oxidized or degraded substance has slightly different absorption of infrared light with different wavelengths at the molecular level, it can be identified according to the infrared spectrum. The present disclosure is adapted for environmental analysis with strict control of oil and gas samples in special fields such as aerospace, and has a wide range of applications.

Finally, it should be noted that the above embodiments are only intended to illustrate the technical solution of the present disclosure, and are not intended to limit it. Although the present disclosure has been described in detail with reference to the foregoing embodiments, it will be understood by those of ordinary skill in the art that the technical scheme described in the foregoing embodiments can still be modified or some or all of the technical features thereof can be equivalently replaced. These modifications or substitutions do not depart the essence of the corresponding technical proposal from the scope of the technical proposal of the embodiments of the present disclosure.

What is claimed is:

1. A measuring device for trace and ultra-trace oil content, comprising:
    a cryogenic enriching device to enrich and sample trace and ultra-trace oil components in a gas;
    an extracting device to extract the oil components, connected to the cryogenic enriching device; and
    an infrared spectrometer to analyze oil content from extraction liquid, connected to the extracting device;
    wherein the cryogenic enriching device includes a Dewar container to receive and discharge liquid nitrogen, and a U-shaped pipe soaked in the liquid nitrogen, wherein the gas circulates in the U-shaped pipe to form a liquid nitrogen cold trap to realize enriching and sampling of oil components in the gas;
    wherein the extracting device includes a container to store an extractant, an input pipe to input the extractant into the U-shaped pipe, an outlet pipe to export the extraction liquid, and an extraction liquid quantitative pipe, wherein the extractant in the input pipe flows into the U-shaped pipe from near the gas inlet thereof, the extraction liquid obtained by extracting flows out of the U-shaped pipe from near the gas outlet thereof and is stored in the extraction liquid quantitative pipe after flowing through the outlet pipe, and the extraction liquid quantitative pipe is employed to measure the volume of the extraction liquid;
    wherein the U-shaped pipe is further provided with a mass flowmeter to measure the total mass of the passed gas, and the oil content in the gas is calculated according to the measured total mass of the gas and the oil concentration of the extraction liquid measured by the infrared spectrometer.

2. The measuring device according to claim 1, wherein the U-shaped pipe is a wall heat exchange steel pipe or a glass pipe, and a plurality of glass microspheres are further filled in the U-shaped pipe, and the glass microspheres interfaces on two sides of the U-shaped pipe are higher than a liquid nitrogen interface.

3. The measuring device according to claim 1, wherein the diameter of the glass microspheres is 0.5-2 mm and the porosity of the filled glass microspheres is 50-85%.

4. The measuring device according to claim 1, wherein dust removal filters are disposed on the inlet end surface and the outlet end surface of the U-shaped pipe, with an
    accuracy of 1 to 5 μm; and automatic controlling valves are disposed at the gas inlet and gas outlet of the U-shaped pipe.

5. The measuring device according to claim 1, wherein the inlet end surface and the outlet end surface of the U-shaped pipe are outside the Dewar container and are adapted to adjust the U-shaped pipe to lift up and down.

6. The measuring device according to claim 1, wherein automatic controlling valves are disposed on the input pipe and the outlet pipe.

7. The measuring device according to claim 1, wherein the extraction liquid quantitative pipe is connected with the infrared spectrometer through a two-way conduit, one end thereof to automatically inject sample and with the other end thereof to discharge the liquid, an automatic controlling valve is disposed at the upstream unshunt place of the two-way conduit, and an automatic controlling valve is further disposed on the end of the two-way conduit to discharge the liquid.

8. The measuring device according to claim 1, wherein the extractant is trichlorotrifluoroethane.

9. The measuring device according to claim 1, wherein the extractant is carbon tetrachloride.

10. The measuring device according to claim 1, wherein a liquid nitrogen injection port and a discharge port are disposed on the Dewar container, and a liquid nitrogen level meter is disposed inside the Dewar container.

11. The measuring device according to claim 1, wherein a thermometer is disposed inside the U-shaped pipe, and a heater is disposed outside the U-shaped pipe, wherein after enriching and sampling in the liquid nitrogen cold trap, the sample is heated to quickly recover to ambient temperature before extracting.

12. A measuring method for trace and ultra-trace oil content with the device according to claim 1, comprising the steps of:
    S1: enriching and sampling the trace and ultra-trace oil components in gas by the liquid nitrogen cold trap;
    S2: extracting the enriched sample by adding the extractant;
    S3: measuring the oil concentration of the extraction liquid by the infrared spectrometer, and calculating the oil mass in the extraction liquid;
    S4: measuring the total mass of passed gas by a mass flowmeter;
    S5: according to the total mass of the gas obtained in the step S4 and the mass of the oil obtained in the step S3, calculating to obtain the oil content in the gas.

13. The measuring method according to claim 12, wherein dust removal filters are disposed on the inlet end surface and the outlet end surface of the U-shaped pipe, with an accuracy of 1 to 5 μm; and automatic controlling valves are disposed at the gas inlet and gas outlet of the U-shaped pipe.

14. The measuring method according to claim 12, wherein the inlet end surface and the outlet end surface of the U-shaped pipe are outside the Dewar container and are adapted to adjust the U-shaped pipe to lift up and down.

15. The measuring method according to claim 12, wherein automatic controlling valves are disposed on the input pipe and the outlet pipe.

16. The measuring method according to claim 12, wherein the extraction liquid quantitative pipe is connected with the infrared spectrometer through a two-way conduit, one end thereof to automatically inject sample, and with the other end thereof to discharge the liquid, an automatic controlling valve is disposed at the upstream unshunt place of the two-way conduit, and an automatic controlling valve is further disposed on the end of the two-way conduit to discharge the liquid.

17. The measuring method according to claim 12, wherein a liquid nitrogen injection port and a discharge port are disposed on the Dewar container, and a liquid nitrogen level meter is disposed inside the Dewar container.

18. The measuring method according to claim 12, wherein a thermometer is disposed inside the U-shaped pipe, and a heater is disposed outside the U-shaped pipe, wherein after enriching and sampling in the liquid nitrogen cold trap, the sample is heated to quickly recover to ambient temperature before extracting.

19. The measuring method according to claim 12, wherein the U-shaped pipe is a wall heat exchange steel pipe or a glass pipe, and a plurality of glass microspheres are further filled in the U-shaped pipe, and the glass microspheres interfaces on two sides of the U-shaped pipe are higher than a liquid nitrogen interface.

20. The measuring method according to claim 19, wherein the diameter of the glass microspheres is 0.5-2 mm and the porosity of the filled glass microspheres is 50-85%.

* * * * *